(12) United States Patent
Jensen

(10) Patent No.: US 7,515,652 B2
(45) Date of Patent: Apr. 7, 2009

(54) DIGITAL MODULATOR FOR A GSM/GPRS/EDGE WIRELESS POLAR RF TRANSMITTER

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 631 days.

(21) Appl. No.: 10/944,552

(22) Filed: Sep. 17, 2004

(65) Prior Publication Data

US 2005/0220219 A1 Oct. 6, 2005

Related U.S. Application Data

(63) Continuation-in-part of application No. 10/816,731, filed on Apr. 2, 2004.

(51) Int. Cl.
*H04L 25/00* (2006.01)
(52) U.S. Cl. .................. 375/308; 375/135; 375/295; 375/297; 375/372
(58) Field of Classification Search .................. 375/140, 375/279, 295, 316, 320, 329, 30–8, 347, 375/372; 455/108
See application file for complete search history.

(56) References Cited

U.S. PATENT DOCUMENTS

| | | | | |
|---|---|---|---|---|
| 6,934,317 B1 * | 8/2005 | Dent | ........................... | 375/140 |
| 7,177,370 B2 * | 2/2007 | Zhang et al. | ................. | 375/297 |
| 2004/0198257 A1 * | 10/2004 | Takano et al. | ............... | 455/108 |
| 2004/0247047 A1 * | 12/2004 | Dennis et al. | ............... | 375/320 |
| 2005/0215206 A1 * | 9/2005 | Granstrom et al. | .......... | 455/102 |
| 2005/0232382 A1 * | 10/2005 | Stikvoort et al. | ............ | 375/347 |
| 2005/0249312 A1 * | 11/2005 | Bode et al. | .................. | 375/308 |
| 2006/0193403 A1 * | 8/2006 | Ali | ............................. | 375/340 |
| 2006/0274844 A1 * | 12/2006 | Walton et al. | ............... | 375/260 |

\* cited by examiner

*Primary Examiner*—Shuwang Liu
*Assistant Examiner*—Hirdepal Singh
(74) *Attorney, Agent, or Firm*—Garlick, Harrison & Markison; James A. Harrison

(57) ABSTRACT

A digital modulator in a radio transmitter includes circuitry for switching between Gaussian Minimum Shift Keying (GMSK) and Phase-Shift Keying (PSK) while maintaining spectral mask requirements. The digital modulator of the present invention includes both GMSK and PSK symbol mappers that produce PSK in-phase and quadrature symbols and GMSK symbols, respectively, to a pulse shaping block. Based on opposite phases of a modulation control signal, the symbol mappers produce either modulated data or a steam of logic zeros to the pulse shaping block. The pulse shaping block filters the received data and multiplexes the data so that each modulated data stream receives non-zero data during a guard time to avoid abrupt changes in the modulated signal that would violate the spectral mask requirements.

20 Claims, 13 Drawing Sheets

DIGITAL MODULATOR FOR A GSM/GPRS/EDGE WIRELESS POLAR RF TRANSMITTER

CROSS REFERENCE TO RELATED PATENTS

The present U.S. Utility Patent Application claims priority pursuant to 35 U.S.C. §120, as a continuation-in-part (CIP), to the following U.S. Utility Patent Application which are hereby incorporated herein by reference in their entirety and made part of the present U.S. Utility Patent Application for all purposes:

1. U.S. Utility application Ser. No. 10/816,731, entitled "RF Transmitter Architecture for Continuous Switching Between Modulation Modes," filed Apr. 2, 2004, now U.S. Pat. No. 7,394,869 issued Jul. 1, 2008; and
2. U.S. Utility application Ser. No. 10/676,320, entitled "Continuous Time Delta Sigma ADC with Dithering," filed Sep. 30, 2003, now U.S. Pat. No. 6,880,262 issued Apr. 19, 2005.

BACKGROUND

1. Technical Field

The present invention relates to wireless communications and, more particularly, to wideband wireless communication systems.

2. Related Art

Modern wireless RF transmitters for applications, such as cellular, personal, and satellite communications, employ digital modulation schemes such as frequency shift keying (FSK) and phase shift keying (PSK), and variants thereof, often in combination with code division multiple access (CDMA) communication. Independent of the particular communications scheme employed, the RF transmitter output signal, sRF(t), can be represented mathematically as $$s_{RF}(t) = r(t)\cos(2\pi f_c t + \theta(t)) \quad (1)$$

where $f_c$ denotes the RF carrier frequency, and the signal components r(t) and θ(t) are referred to as the envelope and phase of $s_{RF}(t)$, respectively.

Some of the above mentioned communication schemes have constant envelope, i,e., $$r(t) = R,$$

and these are thus referred to as constant-envelope communications schemes. In these communications schemes, θ(t) constitutes all of the information bearing part of the transmitted signal. Other communications schemes have envelopes that vary with time and these are thus referred to as variable-envelope communications schemes. In these communications schemes, both r(t) and θ(t) constitute information bearing parts of the transmitted signal.

The most widespread standard in cellular wireless communications is currently the Global System for Mobile Communications (GSM). A second generation standard employs Gaussian Minimum Shift Keying (GMSK), which is a constant-envelope binary modulation scheme allowing raw transmission at a maximum rate of 270.83 kilobits per second (Kbps). In any mobile communication system the radio spectrum is a very limited resource shared by all users. GSM employs a combination of Time Division Multiple Access (TDMA) and Frequency Division Multiple Access (FDMA) for the purpose of sharing the spectrum resource. GSM networks typically operate in the 900 MHz frequency range. The radio spectrum in the bands 890-915 MHz is for the uplink (mobile station to base station) and 935-960 MHz is for the downlink (base station to mobile station). The spectrum for both uplink and downlink is divided into 200 kHz wide carrier frequencies using FDMA, and each base station is assigned one or more carrier frequencies. Each carrier is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames. While GSM is sufficient for standard voice services, future high-fidelity audio and data services demand higher data throughput rates.

General Packet Radio Service (GPRS) is a new non-voice service that allows information to be sent and received across a mobile telephone network. It supplements today's Circuit Switched Data (CSD) and Short Message Service (SMS). GPRS employs the same modulation scheme as GSM, but higher data throughput rates are achievable with GPRS since it allows for all eight timeslots to be used by a mobile station at the same time.

Even higher data rates are achieved in the specification of the Enhanced Data rates for GSM Evolution (EDGE) cellular telephony standard by selectively applying a 3π/8 offset, 8-level PSK (8-PSK) modulation scheme. With this variable-envelope communication scheme, the maximum bit rate is tripled compared to GSM, while the chosen pulse shaping ensures that the RF carrier bandwidth is the same as that of GSM, allowing for the reuse of the GSM frequency bands. Additionally, to further increase the flexibility of data transmission, so-called multi-slot operation has been introduced into GSM/GPRS/EDGE systems. In multi-slot operation, more than one time slot out of the eight in one GSM frame can be used for transmission with GMSK and/or 8-PSK modulation.

As mentioned above, the GMSK modulation scheme of standard GSM is an example of a constant envelope communications scheme. An example transmitter appropriate for such constant-envelope modulation schemes in a mobile station unit is a translational loop transmitter. In this transmitter, the digital baseband data enters a digital processor that performs the necessary pulse shaping and modulation to some intermediate frequency (IF) carrier $f_{IF}$. The resulting digital signal is converted to analog using a digital-to-analog converter (DAC) and a low pass filter (LPF) that filters out undesired digital images of the IF signal. A translational loop, essentially a phase locked loop (PLL), then translates, or up-converts, the IF signal to the desired RF frequency and a power amplifier (PA) delivers the appropriate transmit power to the antenna.

As mentioned above, the 8-PSK modulation scheme of EDGE is an example of a variable envelope communications scheme. In practice, the power spectrum emitted from an EDGE transmitter will not be ideal due to various imperfections in the RF transmitter circuitry. Thus, quality measures of the transmitter performance have been established as part of the EDGE standard and minimum requirements have been set. One quality measure that relates to the RF signal power spectrum is the so-called spectral mask. This mask represents the maximum allowable levels of the power spectrum as a function of frequency offset from the RF carrier in order for a given transmitter to qualify for EDGE certification. In other words, the spectral mask requirements limit the amount of transmitter signal leakage into other users' signal spectrum. For example, at a frequency offset of 400 kHz (0.4 MHz), the maximum allowable emission level is −54 dB relative to the carrier (dBc). Another RF transmitter quality measure of the EDGE standard is the modulation accuracy, which relates the RF transmitter modulation performance to an ideal reference signal. Modulation accuracy is related to the so-called error vector magnitude (EVM), which is the magnitude of the difference between the actual transmitter output and the ideal reference signal. The error vector is, in general, a complex quantity and hence can be viewed as a vector in the complex plane. Modulation accuracy is stated in root-mean-square (RMS), 95th percentile, and peak values of the EVM and is specified as a percentage. For a given transmitter to qualify for EDGE certification, the RMS EVM must be less than 9%, the 95th percentile of EVM values must be less than 15%, and the peak EVM value must be less than 30%.

The increase in system flexibility resulting from the introduction of multi-slot operation in EDGE presents the challenge of finding an efficient implementation of a joint GMSK/8-PSK modulator which enables easy and fast switching between GMSK and 8-PSK modulation in consecutive time slots. Such modulation switching must be achieved within the so-called guard interval, merely 30 microseconds (us) long. Further complication is encountered in the domain of the RF frequency PA. Exploiting the fact that GMSK is a constant envelope modulation scheme, the PA can typically be driven in saturation mode for higher efficiency when transmitting GSM signals. However, due to the variable-envelope properties of the 8-PSK modulation option in EDGE, driving the PA in saturated mode is not possible. Rather, a certain power back-off of the PA input signal level is required to maintain adequate modulation accuracy. Typical transmitter powers may be 33 dBm in GMSK mode and 27 dBm in PSK mode. Thus, when switching modulation schemes in multi-slot operation from GMSK to 8-PSK, or vice versa, a change of PA input signal level must occur. Such change must be achieved within the guard interval and in such a fashion that switching transients do not violate the spectral mask requirements.

Typically, such mask requirements cannot be met when modulation switching occurs with abruptly changing waveforms, but must instead occur in a continuous, smooth manner. Therefore, it is clear that a need exists for a modulation switching scheme that can switch between modulation modes while adhering to spectral mask requirements to improve performance of polar transmitters that are presently being designed.

SUMMARY OF THE INVENTION

The present invention provides a radio transmitter having a digital modulator that further includes circuitry for switching between first and second modulation schemes such as between Gaussian Minimum Shift Keying (GMSK) and Phase-Shift Keying (PSK) in a smooth and continuous manner that does not violate spectral mask requirements. The invention supports continuous modulation switching both ways, i.e., from GMSK to 8-PSK and from 8-PSK to GMSK. Although specific embodiments disclosed herein are directed to Enhanced Data rates for GSM Evolution (EDGE) transmitters, the present invention is more generally applicable to switching between constant envelope and non-constant envelope modulation schemes.

A radio transmitter formed according to one embodiment of the present invention includes both GMSK and PSK symbol mappers that receive transmission (TX) data from a digital source, such as a baseband processor. The PSK and GMSK symbol mappers produce PSK in-phase (I) and quadrature (Q) symbols and GMSK symbols, respectively, to a pulse shaping block. Based on opposite phases of a modulation control signal, the PSK and GMSK symbol mappers produce modulated data or a steam of logic zeros to the pulse shaping block. The pulse shaping block filters the received data and multiplexes the data so that each modulated data stream receives data during the guard time to avoid abrupt changes to the output that would violate the spectral mask requirements.

The pulse shaping block produces filtered GMSK modulated data and PSK I and Q modulated data to phase path adjustment circuitry and an envelope path adjustment circuitry, respectively. Multiplexer (MUX) circuitry in the pulse shaping block is coupled to receive the modulated data, as well as filter coefficients from a transmission (TX) filters look-up table (LUT). In the described embodiment, the TX filters LUT coefficients are pre-multiplied by weights corresponding to the phasor rotation in the 8-PSK constellation. MUX circuitry in the pulse shaping block outputs one of the TX filters LUT output or a logic 0 based on an enable signal. The MUX outputs are further adjusted be a sign select block then coupled to one of the phase path adjustment circuitry or the envelope path adjustment circuitry.

The envelope path adjustment circuitry extracts phase information from the PSK modulated data that is then coupled to the phase path. Equalizer blocks, cancellation circuitry, and interpolation blocks in the envelope path compensate for distortion in the analog portion of the envelope path.

A GMSK modulation index adjustment block adjusts the gain in the phase path to produce the aforementioned power back-off in the PA input signal level. A phase accumulator receives and accumulates phase information that is summed with a phase component extracted from the complex PSK signal. This summing of phase signals provides the smooth transition in the phase path signal when switching between modulation modes. Additional blocks in the phase path adjustment circuitry pre-distorts the phase path signal and up-converts the IF signal to RF before coupling the phase output signal to downstream DACs.

In operation, the radio transmitter initially operates in a first communication mode, transmitting communication signals to a remote agent according to a first protocol utilizing a first modulation technique at a first data rate. For example, the first protocol may comprise a GMSK modulation for legacy communications at a first data rate. Upon determining that the remote agent is capable of communicating in a second protocol at a second data rate utilizing a second modulation technique, the radio transmitter will switch between the first and second modulation techniques. Finally, in a second communication mode, the transmitter transmits communication signals with a remote agent solely according to the second protocol utilizing the second modulation technique at the second data rate. Throughout the first and second communication modes, as well as the transition mode, the transmitter, according to the described embodiments of the invention, will transmit in accordance with spectral mask requirements.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

DETAILED DESCRIPTION OF THE DRAWINGS

Figure 1:
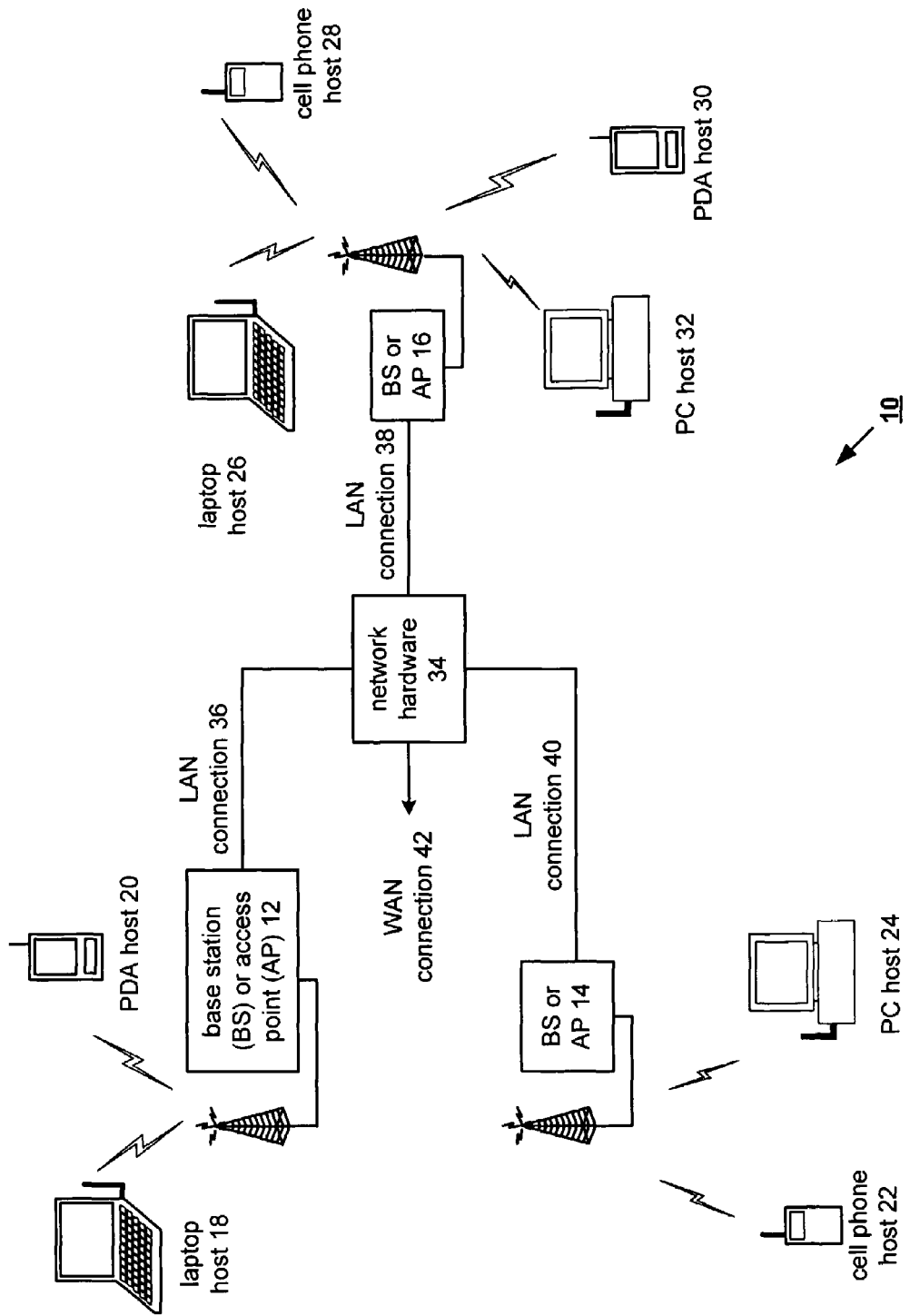
FIG. 1 is a functional block diagram illustrating a communication system that includes a plurality of base stations or access points (APs), a plurality of wireless communication devices and a network hardware component.

A better understanding of the present invention can be obtained when the following detailed description of the preferred embodiment is considered with the following drawings, in which:

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Any of the hosts may include a digital modulator operable in one of a GSM, General Packet Radio Service (GPRS), and EDGE modulation modes. When operating a multi-mode modulator that switches between modulation modes, GMSK and 8-PSK for example, the present invention maintains the RF spectral power within the spectral mask requirements to limit spectral re-growth into adjacent channels.

Figure 2:
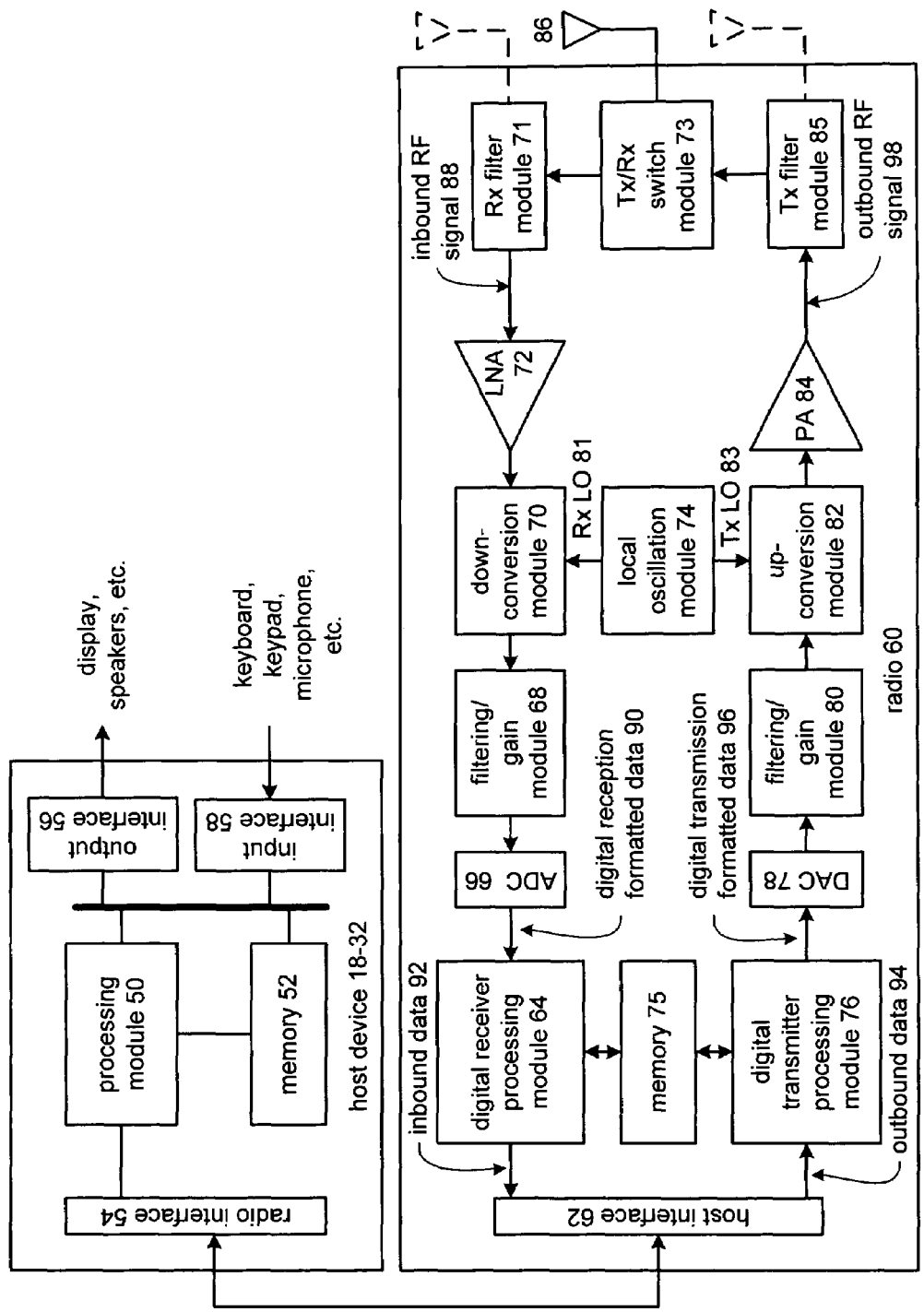
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., GSM, EDGE, IEEE 802.11a, IEEE 802.11b, Bluetooth, etc.) to produce digital transmission formatted data 96. The digital transmission formatted data 96 produced by a digital modulator of the present invention will be a digital baseband signal or a digital low IF signal, where the low IF typically will be in the frequency range of 100 KHz to a few Megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the TX/RX switch module 73, where the RX filter module 71 bandpass filters the inbound RF signal 88. The RX filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3:
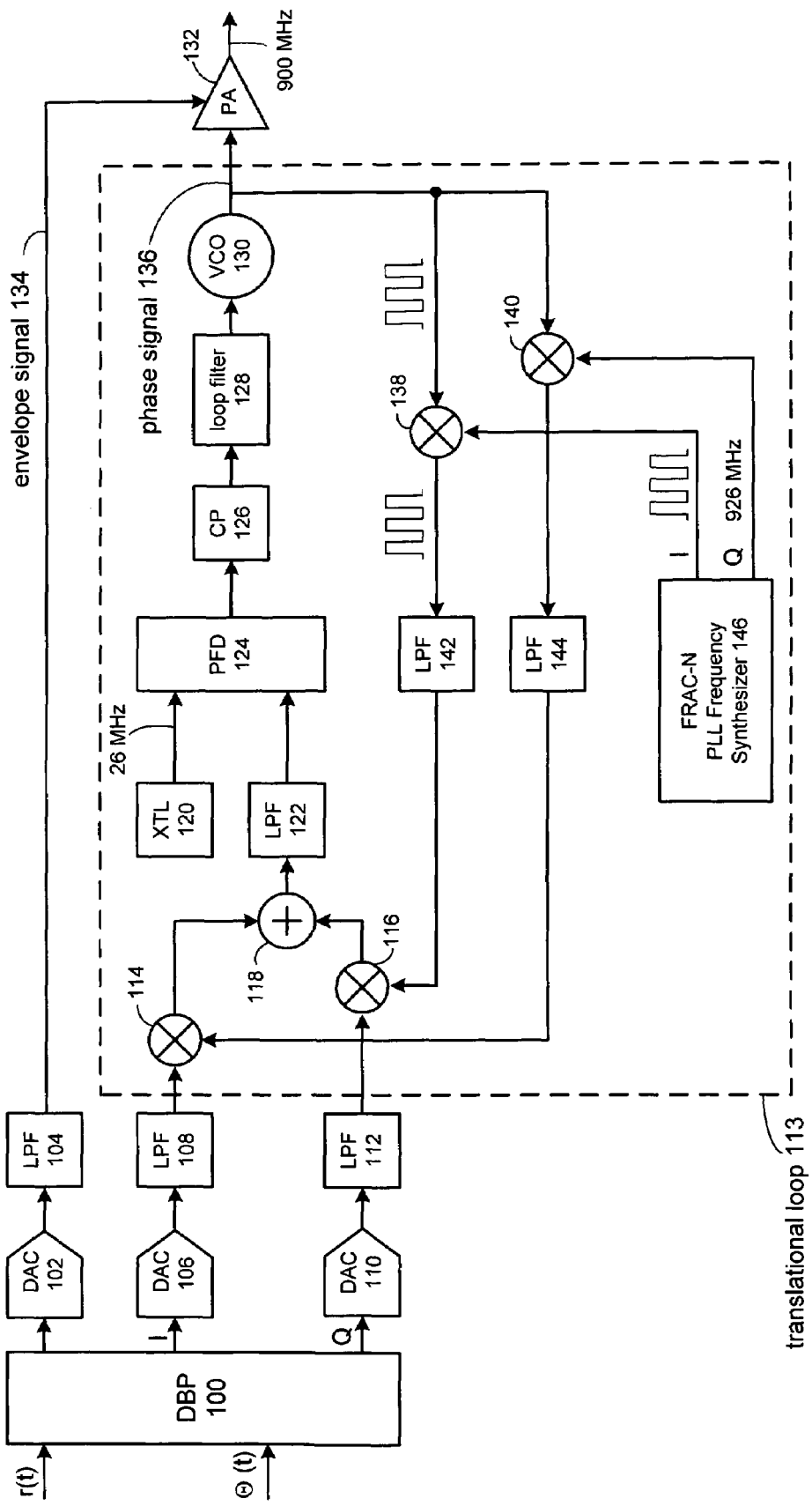
FIG. 3 is a schematic block diagram of a polar transmitter for the EDGE cellular telephony application.

FIG. 3 is a schematic block diagram of a translational loop RF transmitter. The translational loop RF transmitter of FIG. 3 is functionally equivalent to blocks 76, 78, 80, 82, an 84 of FIG. 2. One typical application of the RF transmitter of FIG. 3 is GSM cellular telephony, though the concepts may readily be applied to other types of communication networks. In FIG. 3, it is assumed that a digital processor delivers the envelope signal r(t) and the phase signal θ(t) to the transmitter for further processing and RF transmission. The transmitter includes a digital baseband processor (DBP) 100 that performs the necessary pulse shaping in accordance with the present invention, modulation, and interpolation filtering, followed by in-phase and quadrature digital-to-analog converters (DACs) 102-110, low pass filters (LPFs) 104-112, a translational loop 113, and a power amplifier (PA) 132. The low pass filtered in-phase and quadrature signals are operably coupled to mixers 114 and 116, respectively, and a summing node 118 that combines the mixer outputs that are then low pass filtered by LPF 122. The remaining components of the transmitter are a phase and frequency detector (PFD) 124, 26 MHz crystal reference (X-TAL) 120, a charge pump (CP) 126, a low pass loop filter 128, a voltage controlled oscillator (VCO) 130, a pair of offset mixers 138 and 140, as well as appropriate LPFs 142 and 144. RF channel selection is achieved by employing a Fractional N frequency synthesizer 146. A qualitative description of the operation of the translational loop is as follows. It is easy to show that low pass filtering the sum of the mixing products of the baseband I & Q components with down-converted RF output I & Q components generates a 26 MHz sinusoid whose excess phase component equals the difference between the desired baseband phase signal and the RF output phase signal. The 26 MHz carrier is extracted by the PFD whose output is the phase error signal. With proper PLL design, the closed loop tracking action causes the error signal to approach zero, thus the phase of the RF output carrier at 900 MHz tracks the phase of the baseband signal, as desired. The RF output carrier is modulated in the PA by envelope signal 134.

Figure 4:
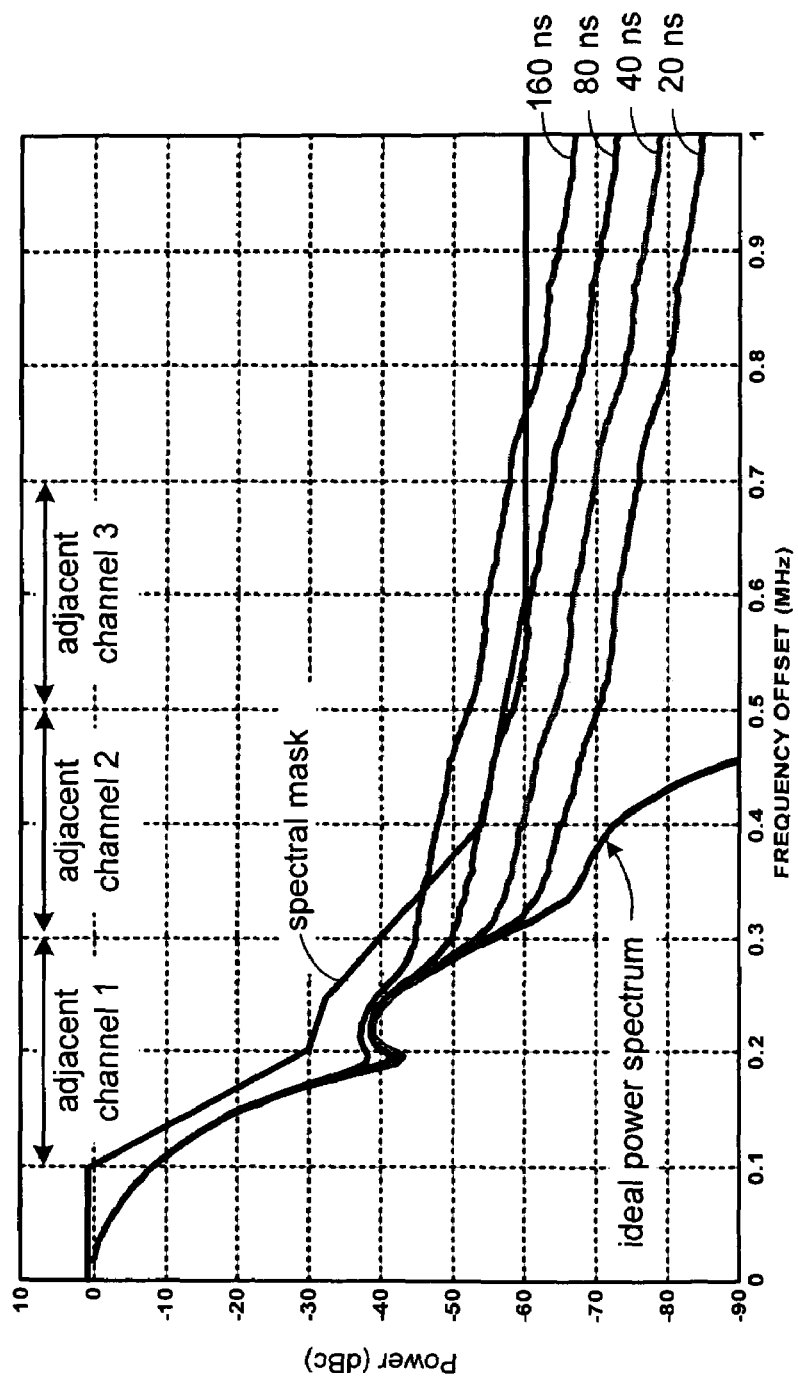
FIG. 4 illustrates an ideal RF signal output power spectrum corresponding to an EDGE signal and the spectral re-growth due to various nanosecond (nS) delay mismatch between the envelope and phase signal paths of the RF polar transmitter.

FIG. 4 illustrates an example of an ideal RF transmitter output signal power spectrum corresponding to the EDGE cellular telephony standard and the spectral mask specification for an EDGE transmitter. The power spectrum is given in dB relative to the center of the signal (dBc), and the frequency scale is relative to the RF carrier frequency. In practice, the power spectrum emitted from an EDGE transmitter will not be ideal due to various imperfections in the RF transmitter circuitry. Thus, quality measures of the transmitter performance have been established as part of the EDGE standard and minimum requirements have been set. One quality measure that relates to the RF signal power spectrum is the spectral mask. The spectral mask represents the maximum allowable levels of the power spectrum as a function of frequency offset from the RF carrier in order for a given transmitter to qualify for EDGE certification. For example, at a frequency offset of 400 kHz (0.4 MHz), the maximum allowable emission level is −54 dBc. Another RF transmitter quality measure of the EDGE standard is the modulation accuracy, which relates the RF transmitter modulation performance to an ideal reference signal. Modulation accuracy is stated in root-mean-square (RMS) and peak values and is specified in percentage format. For a given transmitter to qualify for EDGE certification the RMS modulation error must be less than 9% and the peak modulation error must be less than 30%.

FIG. 4 also illustrates several example RF signal output power spectra corresponding to an EDGE signal with various delay mismatches between the envelope and phase signal paths of the RF polar transmitter and indicates the spectral re-growth for particular values of delay mismatch. FIG. 4 also exemplifies the significant impact of an exemplary delay mismatch of 80 ns or greater, wherein the spectral mask requirement of −54 dBc at 400 kHz offset is not satisfied due to the spectral re-growth. In order to restore the RF transmitter performance, delay mismatch must be substantially canceled. As can be seen in FIG. 4, the spectral re-growth due to delay mismatch increases power in the adjacent channels that contributes to inter-symbol interference and modulation error.

Figure 5:
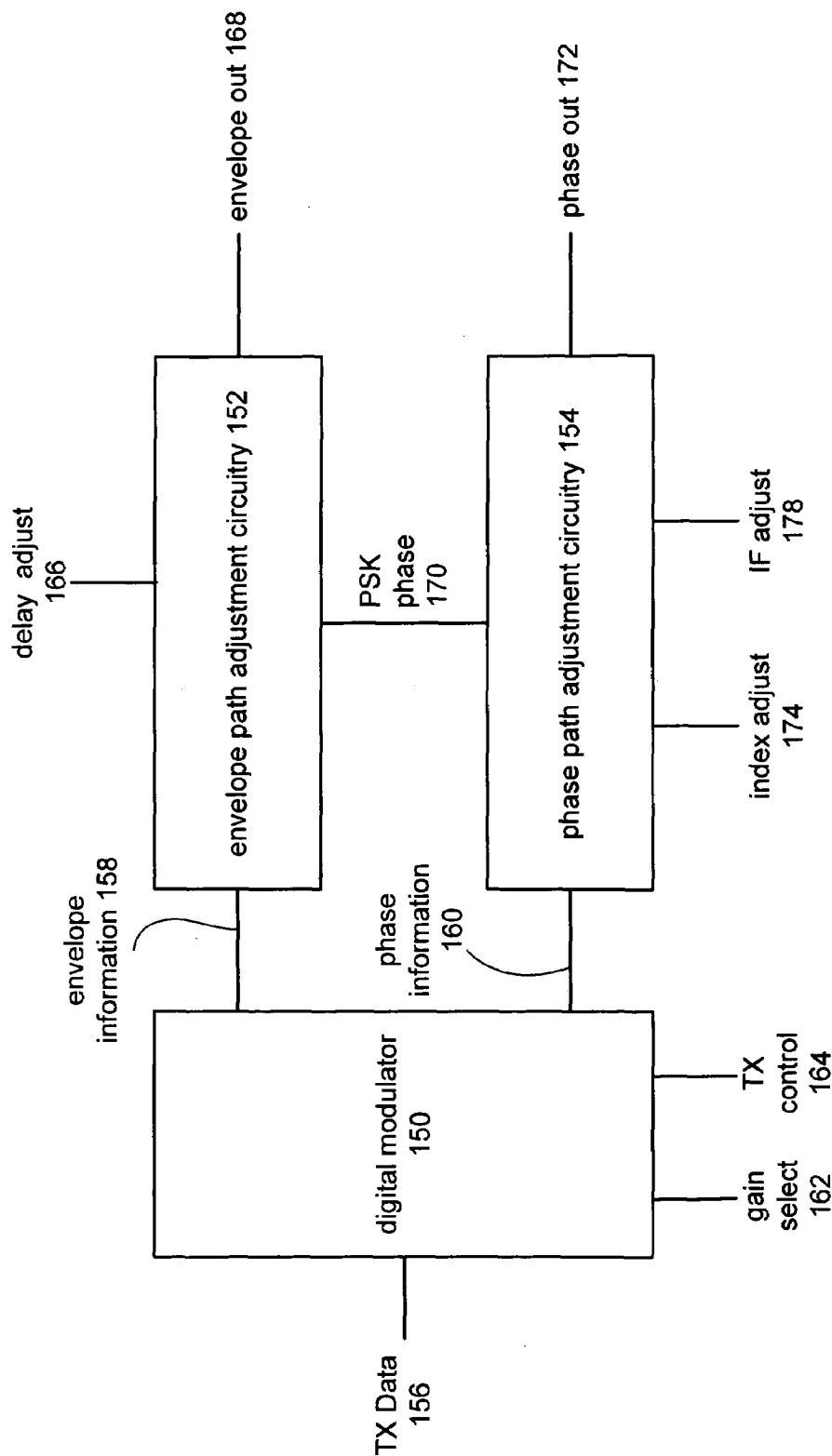
FIG. 5 is a functional block diagram of a digital modulator in accordance with an embodiment of the present invention.

FIG. 5 is a functional block diagram of digital modulator circuitry in accordance with an embodiment of the present invention. The digital modulator circuitry includes a digital modulator 150, envelope path adjustment circuitry 152, and phase path adjustment circuitry 154. In operation, digital modulator 150 receives transmission (TX) data 156 and produces envelope information 158 and phase information 160 based on the TX data 156, a gain select 162, and a TX control 164 received from a base band processor (not shown). Envelope path adjustment circuitry 152 receives envelope information 158 and a delay adjust 166 to provide pre-distortion, delay cancellation, and up-conversion to produce an envelope out 168. Additionally, envelope path adjustment circuitry 152 produces PSK phase 170 to phase path adjustment circuitry 154. The PSK phase 170 provides PSK phase information during the guard time between modulation mode changes from PSK to GMSK to prevent abrupt phase changes that contribute to spectral re-growth into adjacent transmission channels. Phase path adjustment circuitry 154 receives phase information 160 and PSK phase 170 to produce the phase out 172. Index adjust 174 adjusts the GMSK modulation index, if necessary while IF adjust 178 is used to make minor adjustments to the IF frequency.

Figure 6:
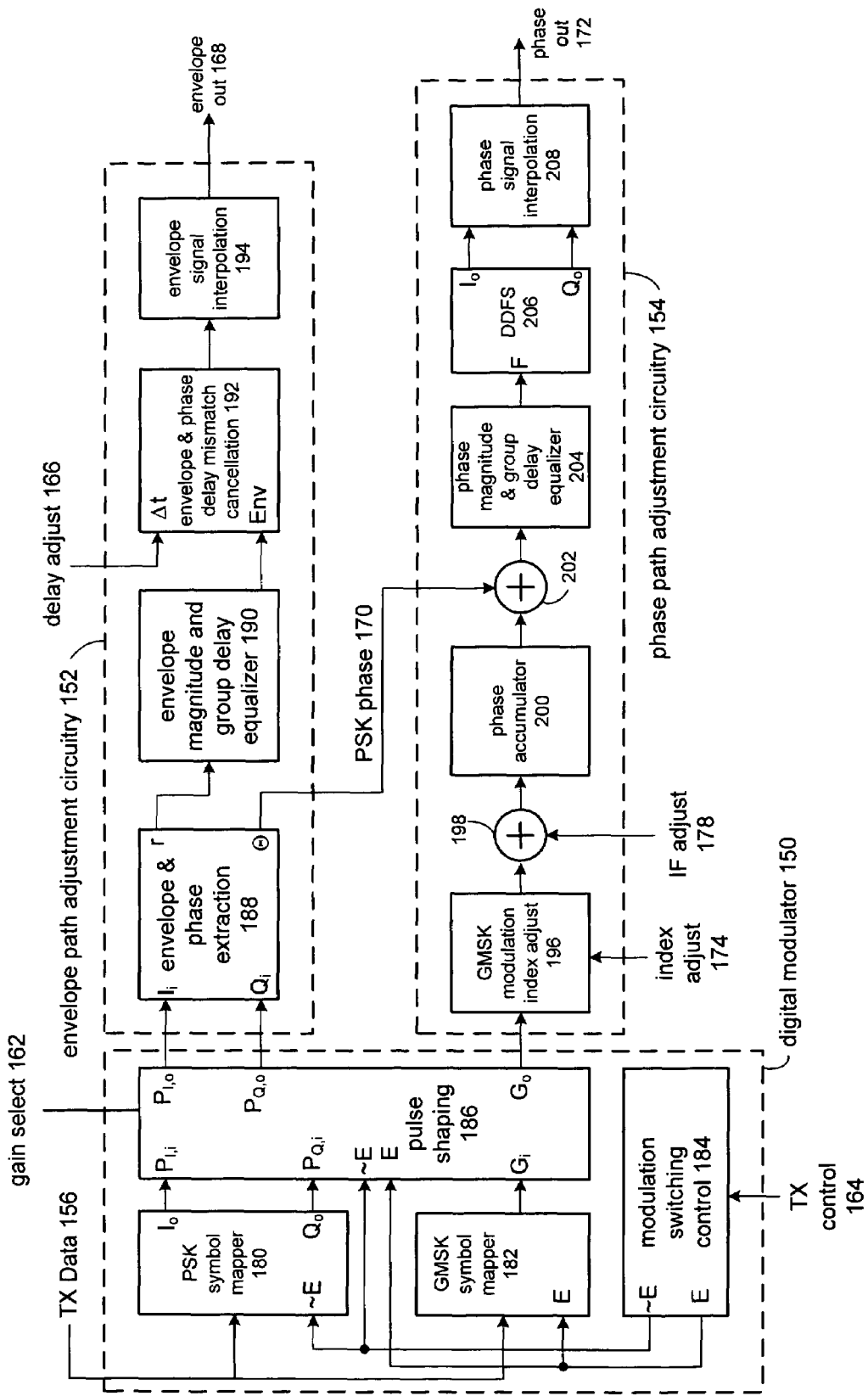
FIG. 6 is a schematic block diagram of a digital modulator in accordance with an embodiment of the present invention.

FIG. 6 is a schematic block diagram of digital modulation circuitry in accordance with an embodiment of the present invention. The digital modulation circuitry consists of a plurality of processing blocks to produce a digital modulator suitable for a GSM, a GPRS, or an EDGE wireless polar RF transmitter. The digital modulator of the present invention is generally applicable to any polar RF transmitter intended to support continuous switching between PSK and GMSK modes, although the described embodiment is directed to the EDGE standard.

As shown in the figure, digital modulator 150 receives TX data 156 and a modulator control signal, TX control 164. The TX data consists of either single bit data for GMSK modulation, or three bit data for 8-PSK modulation. The TX data bits are mapped to transmitter symbols by a PSK symbol mapper 180 and a GMSK symbol mapper 182. Modulation switching control 184 enables one of PSK symbol mapper 180 or GMSK symbol mapper 182 based on a setting of TX control 164. An enable signal (E) and a Not Enable signal (~E) is operable coupled from modulation switching control 184 to GMSK symbol mapper 182, pulse shaping block 186, and PSK symbol mapper 180. The symbols produced by PSK symbol mapper 180 and GMSK symbol mapper 182 are operably coupled to pulse shaping block 186 where the symbols are pulse shaped by a plurality of transmit filters. The process of pulse shaping ensures that the transmitted RF signal is sufficiently band limited so as to not interfere excessively with adjacent RF channels. Specifically, pulse shaping block 186 implements Infinite Impulse Response (IIR) filters for the pulse shaping, consisting of a Gaussian filter with a BT product of 0.3 for the GMSK transmit mode. A similar filter is employed for the PSK mode. The BT product represents a degree of filtering and is derived from the product of the filter 3 dB bandwidth and the bit period of the transmission. The PSK filtered symbols produced by pulse shaping block 186 are complex consisting of in-phase (I) and quadrature (Q) components.

Envelope and Phase Extraction 188 extracts the envelope and phase of the PSK signal and splits the processing paths of the two signal components. The envelope signal is subsequently processed by an Envelope Magnitude and Group Delay Equalizer 190 that pre-distorts the envelope magnitude and group delay response to counteract non-ideal processing by the analog components of the transmitter. Envelope magnitude and group delay equalizer 190 and phase magnitude and group delay equalizer 204 provide digital pre-distortion of the envelope signal and phase signal, respectively. The transmitter contains analog components that impose a certain amount of distortion on the transmitted signal. Such distortion can largely be categorized as magnitude variation and group delay variation. If left uncompensated, such distortion typically leads to degraded modulator performance in the form of unacceptable modulation errors. The equalizers of FIG. 6 are typically digital filters, either Finite Impulse Response (FIR) or Infinite Impulse Response (IIR), and may be divided into two separate sections; one section that pre-distorts the magnitude response and one section that pre-distorts the group delay response. Envelope and phase signal delay mismatch cancellation 192 imposes a programmable delay on the envelope signal specified by the parameter delay adjust 166. The sampling rate of the envelope signal is then increased to an appropriate value by envelope signal interpolation 194, which also performs appropriate signal quantization to remove most of the quantization noise. The sampling rate of the envelope signal is increased to an appropriate value by the envelope signal interpolation block, which also performs appropriate signal quantization.

The pulse shaped Gaussian signal, Go, whose modulation index is nominally set to 0.5, can be fine adjusted by GMSK modulation index adjust 196 based on index adjust 174. The resulting signal is operably coupled to a summing junction 198 where it is summed with an IF adjust 178 to fine adjust the IF frequency, if necessary. Phase accumulator 200 adds the incoming phase signal with a previous (in time) phase signal delayed by one bit period. The resulting summed phase signal is combined with the phase component of the PSK signal, PSK phase 170. As previously discussed, adding the PSK phase 170 provides a smooth transition during the transition from PSK to GMSK modulation modes. Phase magnitude and group delay equalizer 204 pre-distorts the signal from summing junction 202 to counteract distortion imposed by subsequent processing by the analog transmitter components. The pre-distorted signal is up-converted by Direct Digital Frequency Synthesizer (DDFS) 206 then the sampling rate of the modulated complex signal is increased to an appropriate value by phase signal interpolation 208, which also performs appropriate signal quantization. Phase signal interpolation 208 is appropriate for the EDGE polar RF transmitter architecture. The 3.25 MHz $I_o$ and $Q_o$ input signals are up-converted by a 32× up-converter to 104 MHz then low pass filtered and mixed with a local oscillation to extract the signal information from the in-phase and quadrature signals $I_o$ and $Q_o$, respectively. The resultant signals are summed to produce the phase output signal.

Envelope and phase extraction 188 converts the PSK in-phase and quadrature components produced by pulse shaping block 186 to a phase component, $\theta$, and a magnitude component, "r". The phase component, PSK phase 170, is operably coupled to summing junction 202 in the phase path, while the magnitude component is operably coupled to envelope magnitude and group delay equalizer 190. The equalized signal is operably coupled to envelope and phase delay mismatch cancellation 192. Envelope & phase delay mismatch cancellation 192 consists of digital circuitry that implements a programmable delay of the envelope signal, as specified by the variable delay adjust 166. This allows for fine adjustment of the envelope signal delay and hence delay mismatch cancellation between envelope and phase signal paths. Envelope signal interpolation 194 produces an envelope from the envelope and phase adjusted signal. The sampling rate, of the envelope signal is increased to an appropriate value by envelope signal interpolation 194, which also performs appropriate signal quantization.

Figure 7:
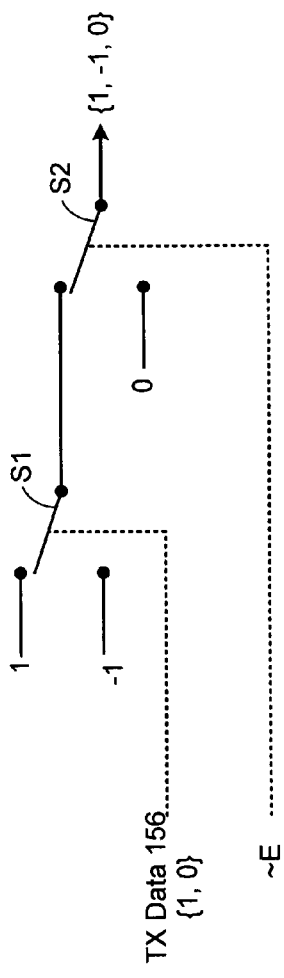
FIG. 7 is a schematic block diagram of a GMSK symbol mapper.

FIG. 7 is a schematic block diagram of the GMSK symbol mapper 182 of FIG. 6. As can be seen in FIG. 7, GMSK symbol mapper 182 receives binary signal TX data 156 comprising logic 1 or logic 0 that maps to a +1 or −1 when the Not Enable (~E) signal is inactive, otherwise the output of the GMSK symbol mapper is 0. More specifically, switch S1 selects one of −1 or +1 based on the logical value of the TX data 156. The output of switch S1 is operably coupled to normally closed switch S2 which receives the output from switch S1. When opened by the Not Enable signal ~E, switch S2 couples a logical 0 to the output. As can be seen, GMSK symbol mapper 182 produces a signal with one of three values: −1, 0, +1. It follows that the $k^{th}$ output of GMSK symbol mapper 182 belongs to the set $$S_{GMSK} = \{\pm 1, 0\}.$$

Figure 8:
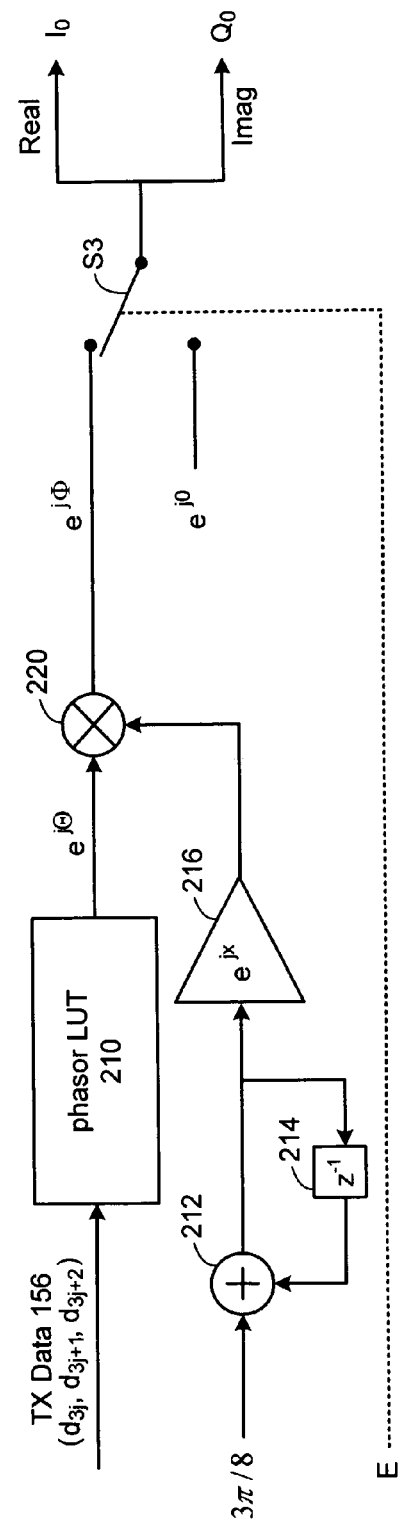
FIG. 8 is a schematic block diagram of a PSK symbol mapper.

FIG. 8 is a schematic block diagram of PSK symbol mapper 180 of FIG. 6. The input is a triplet of bits ($d_{3j}$, $d_{3j+1}$, $d_{3j+2}$) and can thus be interpreted as integers in the range 0 . . . 7. Each bit is mapped to a phasor according to a phasor look-up table (LUT) 210 shown in Table 1.

TABLE 1

Mapping implemented by the Phasor LUT 210 of FIG. 8.

| TX Data bits ($d_{3j}$, $d_{3j+1}$, $d_{3j+2}$) | Phasor |
| --- | --- |
| (1,1,1) | $e^{j0}$ |
| (0,1,1) | $e^{j\pi/4}$ |
| (0,1,0) | $e^{j\pi/2}$ |
| (0,0,0) | $e^{j3\pi/4}$ |
| (0,0,1) | $e^{j\pi}$ |
| (1,0,1) | $e^{-j3\pi/4}$ |
| (1,0,0) | $e^{-j\pi/2}$ |
| (1,1,0) | $e^{-j\pi/4}$ |

The continuous $3\pi/8$ rotation of the constellation required by the EDGE standard is provided by the integrator function comprising a summer 212, a delay element 214 and a multiplier 216. The phasor product $e^{j\Phi}$ results from multiplying the $e^{j\Theta}$ phases output from phasor LUT 210 by multiplier 220 with the $e^{jx}$ output from multiplier 216. When selected by Enable signal (E) received from the modulation switching control 184 of FIG. 6, normally closed switch S3 couples $e^{j0}$ to the output, otherwise the phasor product $e^{j\Phi}$ is coupled to the output. The continuous $3\pi/8$ rotation of PSK symbol mapper 180 prevents the magnitude of the complex signal from becoming zero, or very small, thus avoiding the need for highly linear amplifiers. The outputs, $I_o$ and $Q_o$, of PSK symbol mapper 180 are the real and imaginary parts of the phasor product $e^{j\Phi}$, respectively. It follows that each of these components belong to the set $$S_{PSK} = \left\{\pm 1, \pm\cos\left(\frac{\pi}{8}\right), \pm\frac{1}{\sqrt{2}}, \pm\cos\left(\frac{3\pi}{8}\right), 0\right\}.$$

Figure 9:
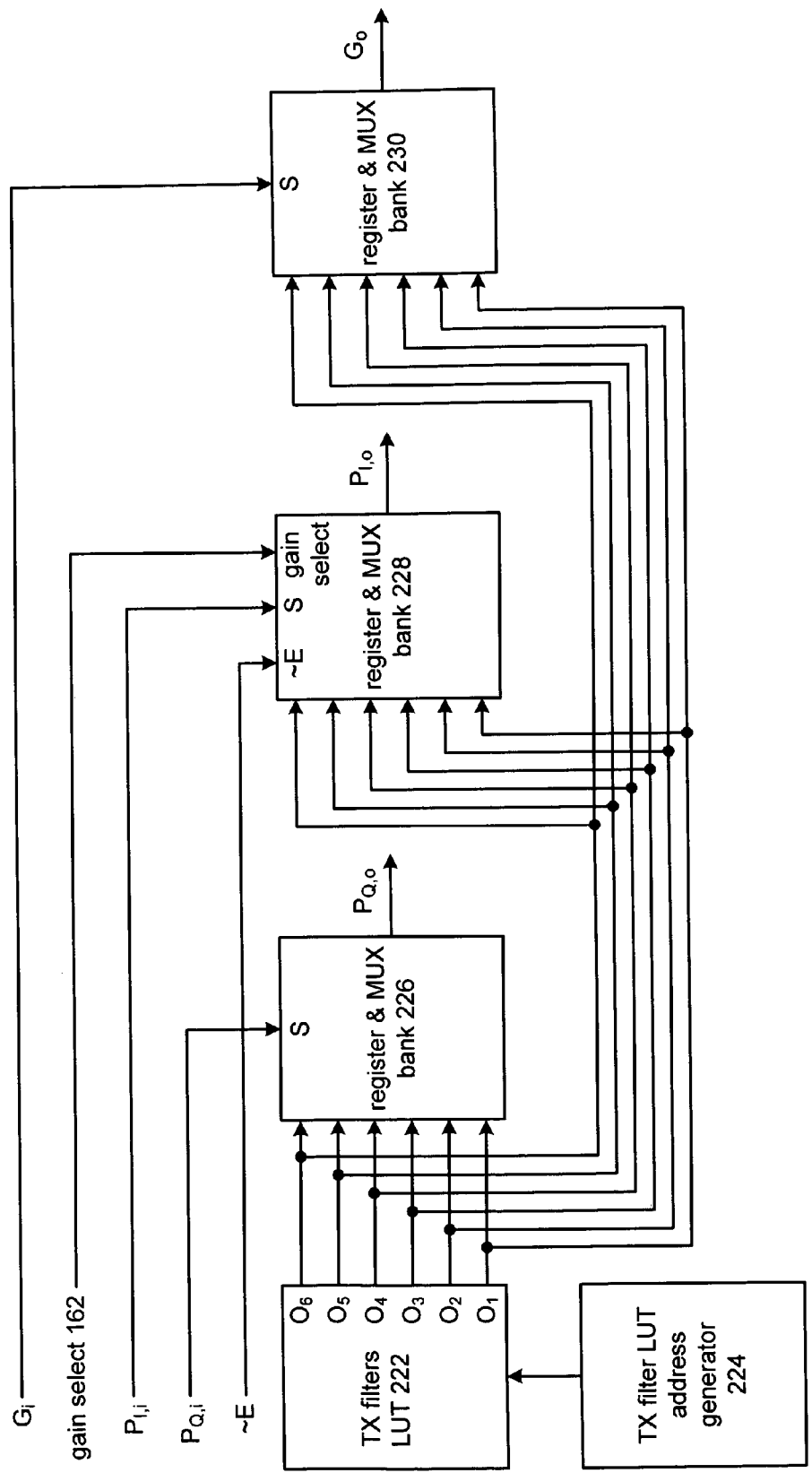
FIG. 9 is a schematic block diagram of a pulse shaping block according to one embodiment of the present invention.

FIG. 9 is a schematic block diagram of pulse shaping block 186 according to one embodiment of the present invention. The TX Filters LUT 222 contains the coefficients of a Gaussian filter for FSK pulse shaping as well as the Root Raised Cosine Filter (RRCF) for PSK pulse shaping. In this example, the filters operate at 12-fold over-sampling, i.e., at a clock rate of 3.25 MHz. The TX Filter LUT Address Generator 224 generates the addresses needed to index into the appropriate locations of TX Filters LUT 222 on a sample-by-sample basis. Register & MUX Bank 226 generates the quadrature component, $P_{Q,o}$, while Register & MUX Bank 228 generates the in-phase component, $P_{I,o}$, for PSK modulation. Register & MUX Bank 230 generates the pulse shaped GMSK signal. For the example EDGE transmitter, the pulse shaping filters are of length 72. Due to filter symmetry, TX Filters LUT 222 therefore contains 36 entries for each pulse shaping filter. Since the filtering interpolates by a factor 12, only six non-zero output values are generated per clock cycle. TX Filter LUT Address Generator 224 maintains two pointers, e.g., "Up-Counter" and "Down-Counter", with initial values of 1 and 36, respectively. For every 3.25-MHz clock cycle, TX Filter LUT Address Generator 224 outputs the following addresses:

Up-Counter,
Up-Counter+12,
Up-Counter+24, and
Down-Counter,
Down-Counter-12,
Down-Counter-24.

Then, Up-Counter is incremented by 1, and Down-Counter is decremented by 1. This continues until Up-Counter reaches 12, then it is reset to 1, and until Down-Counter reaches 25 then it is reset to 36. The outputs O1 ... O6 of TX Filter LUT 222 correspond to the above addresses, respectively, in the order stated.

Figure 10:
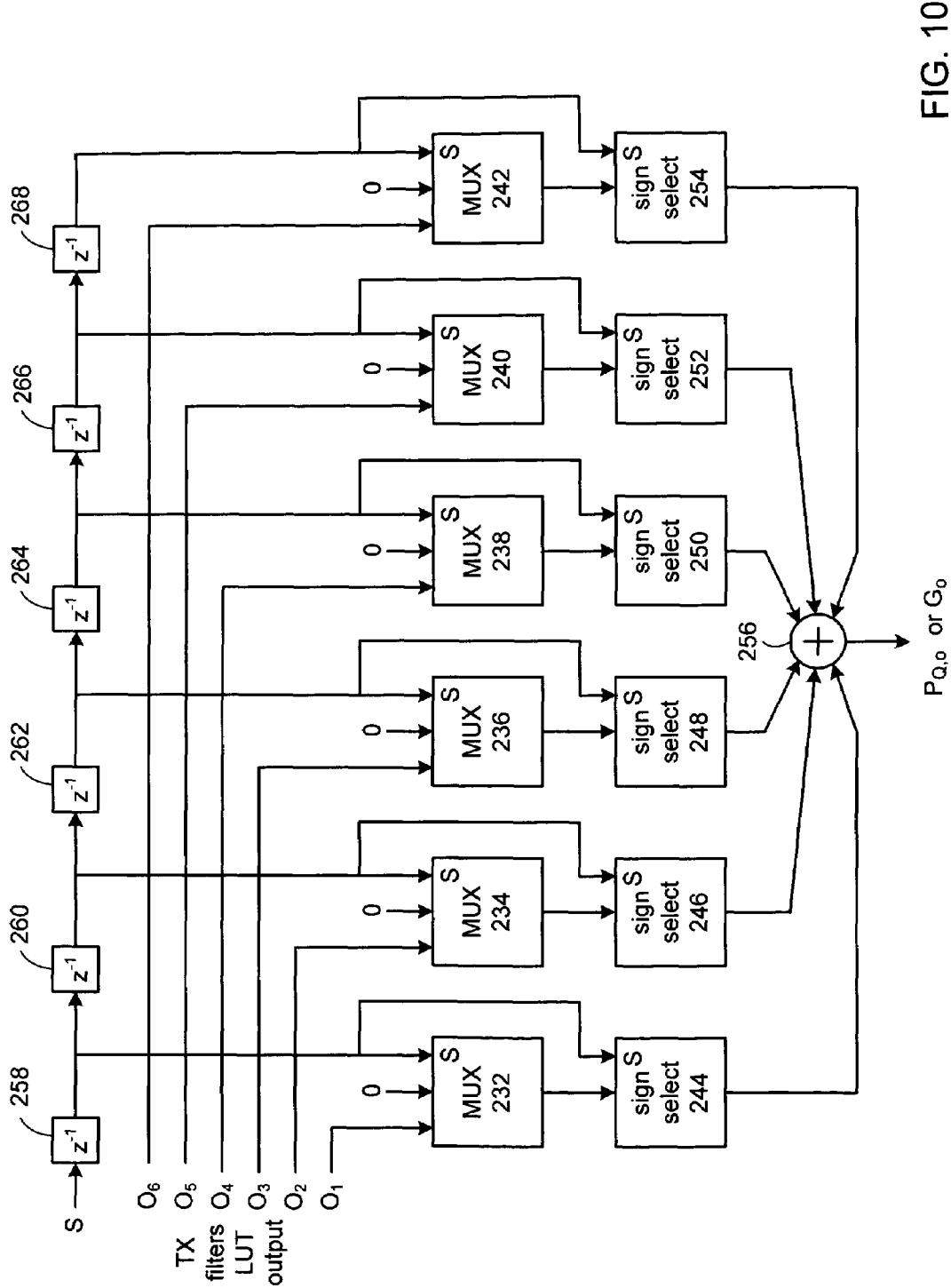
FIG. 10 is a schematic block diagram of an embodiment of a Register and MUX block of the present invention.

FIG. 10 is a schematic block diagram of the Register & MUX Bank in accordance with one embodiment of the present invention. The general structure of FIG. 10 applies for generating the PSK modulation mode output $P_{Q,o}$ and the GMSK modulation mode output $G_o$. An alternate embodiment of the Register & MUX Bank for generating the PSK modulation mode output $P_{I,o}$, will be described with respect to FIG. 11. GMSK and PSK symbols, defined functionally by $$S_{GMSK} = \{\pm 1, 0\} \text{ and}$$

$$S_{PSK} = \left\{\pm 1, \pm \cos\left(\frac{\pi}{8}\right), \pm \frac{1}{\sqrt{2}}, \pm \cos\left(\frac{3\pi}{8}\right), 0\right\},$$

are operably coupled to the MUXs 232-242 at an input "S" through a delay line formed by delay elements 258-268. It follows from the above equations, that the symbols can be processed according to magnitude and sign, thus, a symbol magnitude selects either TX Filters LUT 222 output ($O_i$) or zero according to the magnitude of the symbol coupled to the MUX input S. The sign of the symbol coupled to the S input of Sign Select blocks 244-254 sets the sign of the output. All five outputs are then summed at summing junction 256 to produce the $P_{Q,o}$ output of Register & MUX Bank 226 or the $G_o$ output of Register & MUX Bank 230.

Figure 11:
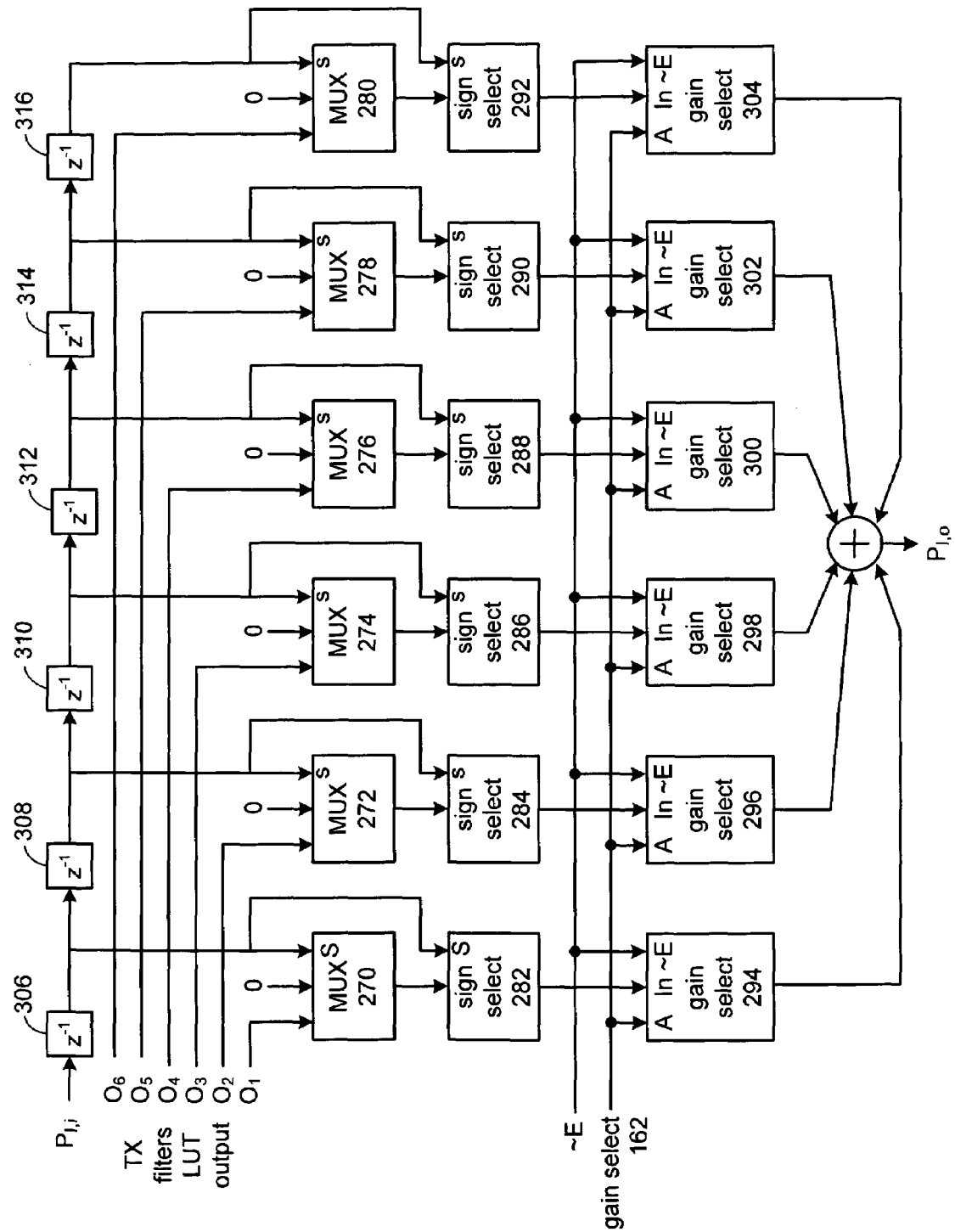
FIG. 11 is a schematic block diagram of a second embodiment of the Register and MUX block of the present invention.

FIG. 11 is a schematic block diagram of Register & MUX Bank block 228 of FIG. 9 according to one embodiment of the present invention. Register & MUX Bank 228 generates the in-phase component, $P_{I,o}$, of pulse shaping block 186 in the PSK modulation mode. Register & MUX Bank block 228 is identical to that of Register & MUX Bank 226 and 230 of FIG. 9, except for Gain Select blocks 294-304. These blocks are activated when the transmitter is in GMSK mode, and allows for smooth transition to GMSK modulation of different average power than that of the PSK modulation. Gain select signal 162 increases or decreases the gain as necessary to compensate for the different gain magnitudes of the constant envelope signal and the non-constant envelope signal. MUXs 270-280 select between either a $c_i$ TX filter LUT output or a zero depending on the sign of the symbol coupled from the delay line formed by delay elements 306-316. Sign select blocks 282-292 perform the sign select function as previously described.

Figure 12:
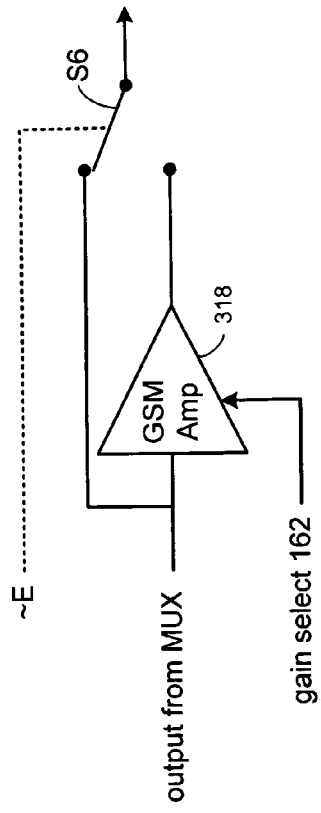
FIG. 12 is a schematic block diagram of a PSK MUX according to an embodiment of the present invention.

FIG. 12 is a schematic block diagram of the MUX of FIG. 10 appropriate for PSK modulation. As shown, the output from the TX Filters LUT 222 consists of four values, c1, c2, c3, and c4, corresponding to calculated filter coefficients. Coefficients c2, c3, and c4 are multiplied by $\cos(\pi/8)$, $1/\sqrt{2}$, and $\cos(3\pi/8)$, respectively, then stored in the LUT. This multiplication avoids the need to computationally generate c2, c3, and c4 in hardware. The S input operably coupled to switch S4 selects either a filter coefficient, $c_i$, or a zero based on the logical value of the S input received from the delay line in the Register & MUX bank.

Figure 13:
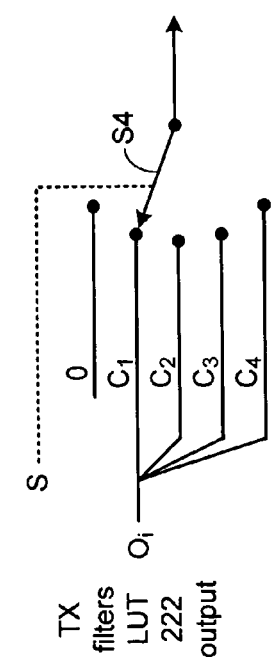
FIG. 13 is a schematic block diagram of a GMSK MUX according to an embodiment of the present invention.

FIG. 13 is a schematic block diagram of the MUX block of FIG. 10 appropriate for GMSK modulation mode. As shown, the output from the TX Filters LUT 222 consists of a single value, $O_i$, corresponding to the desired filter coefficient. The select signal S moves switch S5 from a zero input to the single value TX filters LUT 222 output based on the magnitude of the $G_i$ signal produced from GMSK symbol mapper 182 of FIG. 6.

Figure 14:
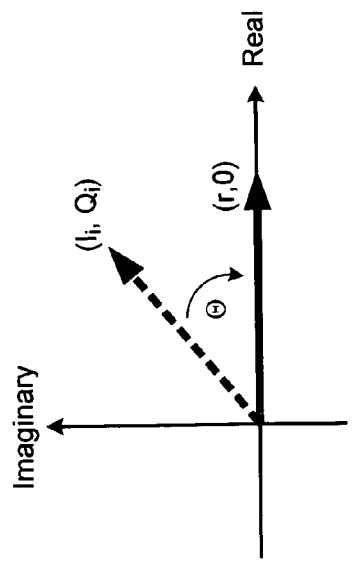
FIG. 14 is a schematic block diagram of a gain select block of the present invention.

FIG. 14 is a schematic block diagram of the gain select block. Based on the logical value of the Not Enable signal, ~E, a gain of either unity for PSK modulation or a gain determined by the parameter gain select 162 is selected by switch S6. Typically, only a few discrete values of gain are needed and GMSK Amplifier 318 may thus be implemented with a few shift-and-add operations.

Figure 15:
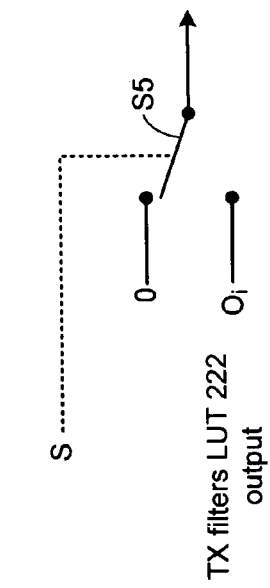
FIG. 15 illustrates the function of an envelope and phase extraction block of the present invention.

FIG. 15 illustrates the function of envelope and phase extraction 188 of FIG. 6. The complex vector input is de-rotated from the complex point ($I_i$, $Q_i$) to the polar point (r, 0), and the envelope and phase are outputted. Table 2 shows the details of the algorithm used to implement the vector de-rotation of FIG. 15. This algorithm is known as the COordinate Rotation DIgital Computer (CORDIC) algorithm.

TABLE 2

Embodiment of vector de-rotation algorithm

```
INPUTS:
    I_i
    Q_i
INTERNAL VARIABLES:      INITIAL VALUE:
    Re                       I_i
    Im                       Q_i
    N                        16
OUTPUTS:
    r
    θ
θ = 0;
for k=1 to N-1
    s = 2^-k
    if Im >= 0
           μ = -1;
    else
           μ = 1;
    end
    θ = θ - (μ * Arctangent(s));
    OldIm = Im;
    Im = Im + (μ * Re * s);
    Re = Re - (μ * OldIm * s);
end
r=Re;
```

Figure 16:
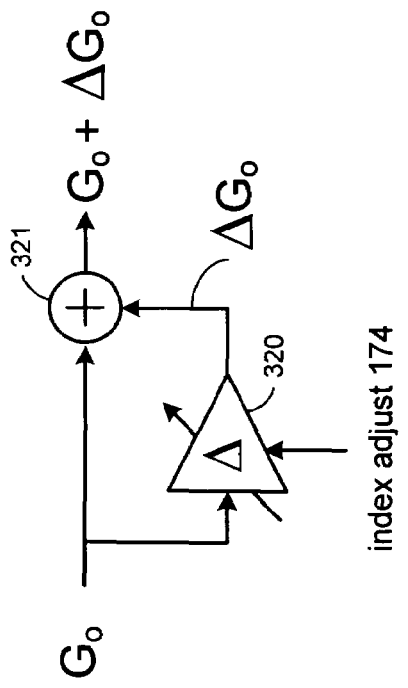
FIG. 16 is a schematic block diagram of a GSMK modulation index adjustment of the present invention.

FIG. 16 is a schematic block diagram of one embodiment of the GMSK Modulation Index Adjust 196. The $G_o$ signal is operably coupled to variable gain amplifier 320 and to summing junction 321. The gain of variable gain amplifier 320 is selected by index adjust 174. This block provides fine adjustment of the GMSK modulation index and is typically implemented with a few shift-and-add operations.

Figure 17:
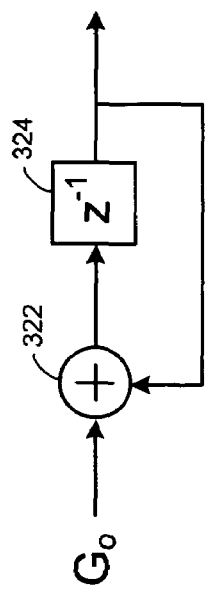
FIG. 17 is a schematic block diagram of a phase accumulator of the present invention.

FIG. 17 is a schematic block diagram of phase accumulator 200 of FIG. 6 of the present invention. The output summing junction 198 of FIG. 6 is operably coupled to phase accumulator 200 of FIG. 6 where it is operably coupled to summing junction 322 that sums the input with a time delayed previous sample produced by delay element 324. The output represents a linearly increasing digital value of the GMSK phase.

Figure 18:
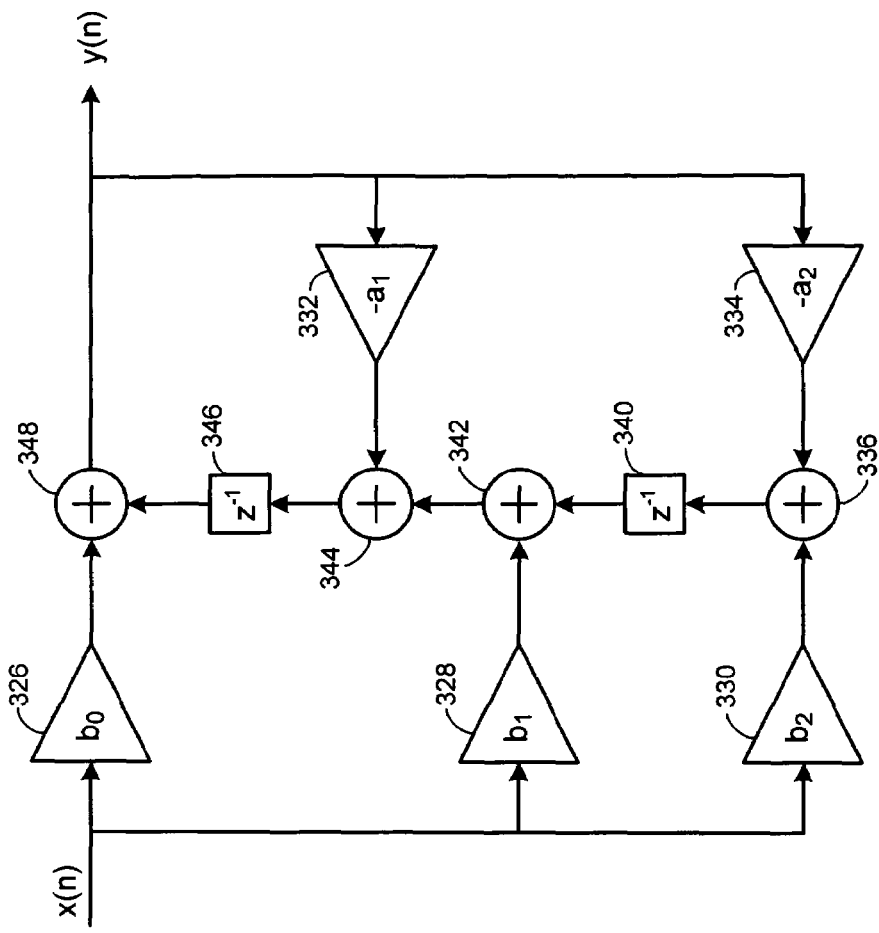
FIG. 18 is a schematic block diagram of a second order Infinite Impulse Response (IIR) filter of the present invention.

FIG. 18 is a schematic block diagram of a second order IIR filter according to an embodiment of the present invention. The IIR filter includes a plurality of feedforward multipliers 326-330 and feedback multipliers 332 and 334 that multiply the input signal x(n) and output signal y(n), respectively, by appropriate filter coefficients $-a_1$, $-a_2$, $b_o$, $b_1$, and $b_2$. Summing junction 336 produces a first summed output from the outputs of multipliers 330 and 334 and couples the first summed output to a delay element 340. The delayed output is summed in summing junction 342 with multiplier 328 output to produce a second summed output. Multiplier 332 multiplies the output signal y(n) by coefficient $-a1$. The multiplied signal is summed in summing junction 344 with the second summed output to produce a third summed output. After a delay produced by delay element 346, the third summed output is summed in summing junction 348 with the output of multiplier 326 to produce the filter output y(n).

The second order IIR is employed in envelope magnitude and group delay equalizer 190 and phase magnitude and group delay equalizer 204 of FIG. 6. This block can be employed as a magnitude equalizer section with a transfer function of the form $$H_{ME}(z) = \frac{b_0 + b_1 z^{-1} + b_2 z^{-2}}{1 + a_1 z^{-1} + a_2 z^{-2}},$$

where the $a_i$ coefficients are feedback components and the $b_i$ coefficients are feedforward components of the transfer function. The z-transform operator $Z^{-n}$ represents a single unit of delay that can be implemented in hardware by shift registers that hold successive filter input and output values.

A second order IIR group delay equalizer section has an all-pass transfer function of the form $$H_{GE}(z) = \frac{c_0 + c_1 z^{-1} + z^{-2}}{1 + c_1 z^{-1} + c_0 z^{-2}},$$

where the filter coefficients are chosen such that the equalization function is optimized.

Figure 19:
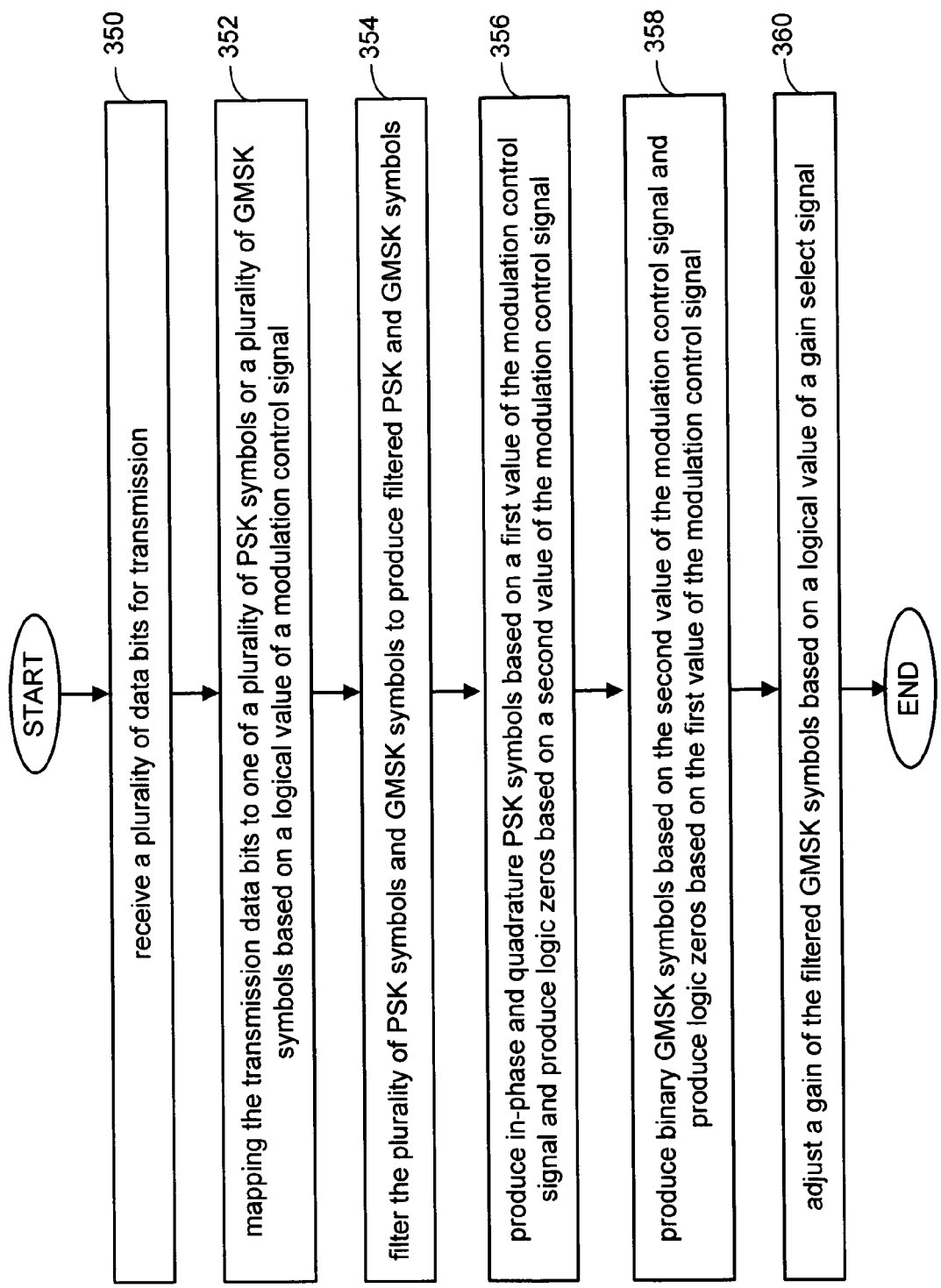
FIG. 19 is a flow chart illustrating a method in a polar RF transmitter within a radio transceiver for producing Phase-Shift Keying (PSK) and Gaussian Minimum-Shift Keying (GMSK) modulated communication signals.

FIG. 19 is a flow chart illustrating a method in a polar RF transmitter within a radio transceiver for producing Phase Shift Keying (PSK) and Gaussian Minimum Shift Keying (GMSK) modulated communication signals. A digital modulator in the polar RF transmitter receives a plurality of data bits for transmission (step 350). The transmission data bits are typically received from a digital processor, such as a baseband processor, and represent the baseband digital data to be transmitted to a mobile host, such as hosts 18-23 of FIG. 1. The method then maps the transmission data bits to one of a plurality of PSK symbols or a plurality of GMSK symbols based on a logical value of a modulation control signal (step 352). The modulation control signal is received from the digital processor which selects the modulation mode. Mapping the transmission data bits to PSK symbols includes mapping the transmission data bits to a plurality of magnitude signals based on a value in a phasor look-up table then multiplying the plurality of magnitude signals by a polar frequency to produce in-phase and quadrature signals.

Once the transmission data bits have been mapped to modulation symbols, the symbols must be shaped to remove high-frequency components that cause the signal to spread into adjacent channels resulting in spectral mask violations. A pulse shaping block filters the plurality of PSK symbols and GMSK symbols to produce filtered PSK and GMSK symbols (step 354). The filters in the pulse shaping block comprises one of a Finite Impulse Response (FIR) filter coefficients or a plurality of Infinite Impulse Response (IIR) filters. Thereafter, the method produces in-phase and quadrature PSK symbols based on a first value of the modulation control signal and produces logic zeros based on a second value of the modulation control signal (step 356) and produces binary GMSK symbols based on the second value of the modulation control signal and produces logic zeros based on the first value of the modulation control signal (step 358). To avoid saturating the transmitter power amplifier, the gain of the phase signal is adjusted based on the modulation mode, so the method adjusts a gain of the filtered GMSK symbols based on a logical value of a gain select signal (step 360).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A polar radio frequency (RF) transmitter within a radio transceiver for producing Phase Shift Keying (PSK) and Gaussian Minimum Shift Keying (GMSK) modulated communication signals, comprising:

a baseband processor for producing transmission (TX) data and a TX control signal;

a digital modulator that receives the TX data, that digitally modulates the TX data to produce one of a PSK and GMSK symbol based upon the TX control signal, wherein the digital modulator further includes:

a modulation switching control block that receives the TX control signal, producing a modulation control signal to select one of a PSK modulation and GMSK modulation mode;

a PSK symbol mapper operably coupled to receive the TX data that produces in-phase and quadrature phase PSK symbols based on the TX data and further based on a first value of the modulation control signal and that produces logic zero digital signals based on a second value of the modulation control signal;

a GMSK symbol mapper operably coupled to receive the TX data that produces binary GMSK symbols based on the TX data and further based on the second value of the modulation control signal and that produces logic zero signals based on the first value of the modulation control signal;

a pulse shaping block for filtering the PSK and GMSK symbols, wherein the pulse shaping block produces filtered PSK symbols for the first value of the modulation control signal and produces filtered GMSK symbols for the second value of the modulation control signal;

envelope path adjustment circuitry operably coupled to receive the filtered PSK symbols that produces an envelope signal and a PSK phase signal; and phase path adjustment circuitry operably coupled to receive the filtered GMSK symbols and the PSK phase signal produced by the envelope path adjustment circuitry, wherein the phase path adjustment circuitry produces a phase signal based on the filtered GMSK symbols and the PSK phase signal;

first and second Digital-to-Analog converters (DACs) for converting the envelope signal and the phase signal, respectively, from digital signals to analog signals to produce analog envelope signal and analog phase signal;

first and second low pass filters for filtering the analog envelope signal and the analog phase signal, respectively;

translational loop operably coupled to receive the analog phase signal to up-convert the analog phase signal from an IF frequency to an RF frequency; and a power amplifier for producing a modulated RF signal based on the RF frequency analog phase signal and the analog envelope signal.

2. The polar RF transmitter of claim 1 wherein the pulse shaping block comprises one of a Finite Impulse Response (FIR) filter and an Infinite Impulse Response (IIR) filter.

3. The polar RF transmitter of claim 1 wherein a gain select block increases a gain magnitude of the GMSK symbol based on a baseband gain select signal.

4. The polar RF transmitter of claim 1 further including an envelope and phase extraction block that comprises a COordinate Rotation DIgital Computer (CORDIC).

5. The polar RF transmitter of claim 1 wherein the PSK symbol mapper further includes:
a phasor look-up table for mapping the TX data to a plurality of magnitude signals;
an integrator for producing a polar signal having a constant angular frequency; and
a multiplier for multiplying the plurality of magnitude signals by the constant angular frequency to produce in-phase and quadrature phase signals.

6. A polar radio frequency (RF) transmitter within a radio transceiver for producing Phase Shift Keying (PSK) and Gaussian Minimum Shift Keying (GMSK) modulated communication signals, comprising:

a baseband processor for producing transmission (TX) data and a TX control signal;

a digital modulator that receives the TX data, that digitally modulates the TX data to produce one of a PSK and GMSK modulated digital signal based upon the TX control signal;

envelope path adjustment circuitry operably coupled to receive a PSK modulated digital signal that produces an envelope signal and a PSK phase signal, the envelope path adjustment circuitry comprising:
envelope and phase extraction block that produces a phase signal and an envelope signal based on the PSK modulated digital signal;
envelope magnitude and group delay equalizer block that pre-distorts the envelope signal to substantially compensate for expected distortion in an analog portion of an envelope path;
envelope and phase mismatch cancellation block for substantially canceling a timing mismatch between the envelope and a phase path; and
envelope signal interpolation block that increases a sampling rate of the PSK modulated digital signal;

phase path adjustment circuitry operably coupled to receive the GMSK modulated digital signal and the PSK phase signal produced by the envelope path adjustment circuitry, wherein the phase path adjustment circuitry produces an outgoing phase signal based on the GMSK modulated digital signal and the PSK phase signal;

first and second Digital-to-Analog converters (DACs) for converting an outgoing envelope signal and the outgoing phase signal, respectively, from digital signals to analog signals to produce an analog envelope signal and an analog phase signal;

first and second low pass filters for filtering the analog envelope signal and the analog phase signal, respectively;

translational loop operably coupled to receive the analog phase signal to up-convert the analog phase signal from an IF frequency to an RF frequency; and a power amplifier for producing a modulated RF signal based on the RF frequency analog phase signal and the analog envelope signal.

7. The polar RF transmitter of claim 6 wherein the envelope and phase mismatch cancellation block includes a delay adjustment block that inserts at least one interpolated data bit in the PSK modulated digital signal to increase signal propagation in the envelope signal path.

8. The polar RF transmitter of claim 6 wherein the digital modulator includes:
a modulation switching control block that receives the TX control signal, producing a modulation control signal to select one of a PSK modulation and GMSK modulation mode;
a PSK symbol mapper operably coupled to receive the TX data and to produce in-phase and quadrature PSK modulated digital signals based on the TX data and a first value of the modulation control signal and to produce logic zeros based on a second value of the modulation control signal;
a GMSK symbol mapper operably coupled to receive the TX data and to produce binary GMSK modulated digital signals based on the TX data and the second value of the modulation control signal and to produce logic zeros based on the first value of the modulation control signal; and
a pulse shaping block for filtering the PSK and GMSK modulated digital signals, wherein the pulse shaping block produces filtered PSK modulated digital signals during the first value of the modulation control signal and produces filtered GMSK modulated digital signals during the second value of the modulation control signal.

9. The polar RF transmitter of claim 8 wherein the PSK and GMSK modulated digital signals are multiplied by filter coefficients corresponding to one of a Finite Impulse Response (FIR) filter and an Infinite Impulse Response (IIR) filter.

10. A polar radio frequency (RF) transmitter within a radio transceiver for producing Phase Shift Keying (PSK) and Gaussian Minimum Shift Keying (GMSK) modulated communication signals, comprising:

a baseband processor for producing transmission (TX) data and a TX control signal;

a digital modulator that receives the TX data, that digitally modulates the TX data to produce one of a PSK and GMSK modulated digital signal based upon the TX control a phase path;

envelope path adjustment circuitry operably coupled to receive the PSK modulated digital signal that produces a PSK phase signal and an outgoing envelope signal;

phase path adjustment circuitry operably coupled to receive the GMSK modulated digital signal and the PSK phase signal produced by the envelope path adjustment circuitry, wherein the phase path adjustment circuitry produces an outgoing phase signal, the phase path adjustment circuitry comprising:

a GMSK modulation index adjust block that adjusts the modulation index based on an index adjust signal;

a phase accumulator coupled to receive GMSK phase information, the phase accumulator producing an accumulated phase signal;

phase magnitude and group delay equalizer block for pre-distorting the accumulated phase signal to substantially compensate for expected distortion in an analog portion of an envelope path;

Direct Digital Frequency Synthesizer (DDFS) block for modulating the pre-distorted phase signal; and phase signal interpolation block for increasing a signaling rate of the outgoing phase signal;

first and second Digital-to-Analog converters (DACs) for converting the outgoing envelope signal and the outgoing phase signal, respectively, from digital signals to analog signals to produce an analog envelope signal and an analog phase signal;

first and second low pass filters for filtering the analog envelope signal and the analog phase signal, respectively;

translational loop operably coupled to receive the analog phase signal to up-convert the analog phase signal from an IF frequency to an RF frequency analog phase signal; and a power amplifier for producing a modulated RF signal based on the RF frequency analog phase signal and the analog envelope signal.

11. The polar RF transmitter of claim 10 wherein the phase path adjustment circuitry further includes a summing junction that sums the PSK phase signal with the accumulated phase signal to provide a smooth transition in the outgoing phase signal during a transition from PSK modulation to GMSK modulation.

12. The polar RF transmitter of claim 10 wherein the digital modulator includes:

a modulation switching control block that receives the TX control signal, producing a modulation control signal to select one of a PSK modulation and GMSK modulation mode;

a PSK symbol mapper operably coupled to receive the TX data and to produce in-phase and quadrature PSK modulated digital signals based on the TX data and a first value of the modulation control signal and to produce logic zeros based on a second value of the modulation control signal;

a GMSK symbol mapper operably coupled to receive the TX data and to produce binary GMSK modulated digital signals based on the TX data and the second value of the modulation control signal and to produce logic zeros based on the first value of the modulation control signal; and a pulse shaping block for filtering the PSK and GMSK modulated digital signals, wherein the pulse shaping block produces filtered PSK modulated digital signals during the first value of the modulation control signal and produces filtered GMSK modulated digital signals during the second value of the modulation control signal.

13. The polar RF transmitter of claim 12 wherein the phase path adjustment circuitry receives an IF adjust signal to adjust a frequency of an IF signal.

14. The polar RF transmitter of claim 12 wherein the PSK and GMSK modulated digital signals are multiplied by filter coefficients corresponding to one of a Finite Impulse Response (FIR) filter and an Infinite Impulse Response (IIR) filter.

15. The polar RF transmitter of claim 12 wherein the PSK symbol mapper includes:

a phasor look-up table for mapping the TX data bits to a plurality of magnitude signals;

an integrator for producing a polar signal having a constant angular frequency; and a multiplier for multiplying the plurality of magnitude signals by the constant angular frequency to produce in-phase and quadrature phase signals.

16. A method in a polar RF transmitter of a radio transceiver for producing Phase Shift Keying (PSK) and Gaussian Minimum Shift Keying (GMSK) modulated communication signals, the method comprising:

producing, in a baseband processor of the radio transceiver, a plurality of transmission (TX) data bits for transmission from the polar RF transmitter of the radio transceiver;

modulating the TX data bits to generate one of a plurality of PSK signals or a plurality of GMSK signals based on a logical value of a modulation control signal;

when the TX data is modulated to generate the plurality of PSK signals, producing phase signals and envelope signals;

pre-distorting the phase signals to substantially compensate for expected distortion in an analog portion of a phase path;

when the TX data is modulated to generate the plurality of GMSK signals, increasing a sampling rate of the GMSK signals;

filtering at least one of the plurality of PSK signals and the plurality of GMSK signals to produce at least one of filtered PSK and GMSK signals based on the modulation control signal;

when the TX data is modulated to generate the plurality of GMSK signals, receiving the filtered GMSK signals and receiving, from envelope path adjustment circuitry, PSK phase signals and producing an outgoing signal based on the filtered GMSK signals and the PSK phase signals by adjusting a phase of the filtered GMSK signals based on a PSK phase value of the PSK phase signals; and upconverting the outgoing signal to radio frequency and power amplifying the upconverted radio frequency signal for transmission.

17. The method of claim 16 further comprising:

producing in-phase and quadrature PSK signals based on a first value of the modulation control signal and producing logic zeros based on a second value of the modulation control signal.

18. The method of claim 16 further comprising:

producing binary GMSK signals based on the second value of the modulation control signal and producing logic zeros based on the first value of the modulation control signal.

19. The method of claim 16 wherein the filtering comprises multiplying the PSK and GMSK signals by one of a plurality of Finite Impulse Response (FIR) filter coefficients or a plurality of Infinite Impulse Response (IIR) filter coefficients.

20. The method of claim 16 wherein the modulating the transmission data bits to PSK signals further includes:

mapping the transmission data bits to a plurality of magnitude signals based on a value in a phasor look-up table; and multiplying the plurality of magnitude signals by a polar frequency to produce in-phase and quadrature phase signals.

* * * * *

UNITED STATES PATENT AND TRADEMARK OFFICE
CERTIFICATE OF CORRECTION

PATENT NO. : 7,515,652 B2
APPLICATION NO. : 10/944552
DATED : April 7, 2009
INVENTOR(S) : Henrik T. Jensen It is certified that error appears in the above-identified patent and that said Letters Patent is hereby corrected as shown below:

Title Page, Item (63): after "filed on Apr. 2, 2004" insert --and a continuation-in-part of application No. 10/676,320, filed on Sep. 30, 2003--.

Column 19, line 20, in Claim 10: replace "a phase path;" with --signal;--.

Column 19, line 40, in Claim 10: replace "an envelope path;" with --a phase path;--.

Signed and Sealed this

Twenty-third Day of November, 2010

David J. Kappos
*Director of the United States Patent and Trademark Office*